United States Patent
Arntz et al.

(10) Patent No.: US 7,111,489 B2
(45) Date of Patent: Sep. 26, 2006

(54) TONE WHEEL SENSOR TESTER

(75) Inventors: Robert T Arntz, Auburn Hills, MI (US); Ronald A LeBourdais, Highland, MI (US); Thomas E Deweerdt, Ortonville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 196 days.

(21) Appl. No.: 10/857,791

(22) Filed: May 28, 2004

(65) Prior Publication Data

US 2005/0262921 A1    Dec. 1, 2005

(51) Int. Cl.
*G10H 7/00* (2006.01)

(52) U.S. Cl. ....................................... 73/1.37
(58) Field of Classification Search ............... 73/1.37, 73/1.41, 118.1; 324/500, 537, 546, 555, 324/556, 503, 538
See application file for complete search history.

(56) References Cited

U.S. PATENT DOCUMENTS

| 4,301,755 A | * | 11/1981 | Kato et al. ............... 112/444 |
| 4,564,916 A | | 1/1986 | Hori et al. |
| 5,350,882 A | * | 9/1994 | Koguchi et al. .............. 84/636 |
| 5,807,283 A | * | 9/1998 | Ng .............................. 600/595 |
| 5,948,026 A | | 9/1999 | Beemer, II. et al. |
| 5,964,813 A | | 10/1999 | Ishii et al. |
| 6,037,779 A | | 3/2000 | Deweerdt et al. |
| 6,181,992 B1 | | 1/2001 | Gurne et al. |
| 6,204,770 B1 | * | 3/2001 | Johnson ..................... 340/660 |

* cited by examiner

*Primary Examiner*—Robert Raevis
(74) *Attorney, Agent, or Firm*—Ralph E. Smith

(57) ABSTRACT

An electrical diagnostic tool for in situ testing of a tone wheel sensor mounted in proximity of a rotatable tone wheel. The tone wheel sensor produces a periodic pulse train signal as the rotatable tone wheel is rotated. The tool has a signal conditioning block for receiving the periodic pulse train signal and generating therefrom a logic-level signal having a frequency. A digital counter has a plurality of outputs and is clocked by the logic-level signal. A plurality of LEDs controlled by the digital counter are used to determine the operational condition of the tone wheel sensor by sequentially illuminating the LEDs at the frequency and in accordance with a counting sequence of the digital counter.

20 Claims, 2 Drawing Sheets

TONE WHEEL SENSOR TESTER

FIELD OF THE INVENTION

This invention relates generally to portable electrical test tools for diagnosing a vehicle electrical system, and more particularly to tools for testing sensors of the electrical system.

BACKGROUND OF THE INVENTION

Modern vehicles have a plurality of electronic sensors for providing input data to their control computers. One class of sensors provides data relating to the rotational position of a rotating component, such as a shaft or wheel. These sensors, which may be referred to generically as tone wheel sensors, are positioned in proximity to a toothed or slotted metal target wheel, which is either formed integral to the rotating component or attached to it. As the target wheel rotates with the component, the tone wheel sensor emits an electrical pulse each time a tooth or slot passes it. The time periods of the electrical pulses are used by the vehicle computer to determine the rotational speed or position of the rotating component as is known in the art. Such systems are commonly used to determine the positions of the camshaft and crankshaft in the engine, the speeds of various shafts in the transmission, and the speed of each road wheel.

From time to time, it becomes necessary to diagnose a tone wheel position sensor to determine whether it is malfunctioning. Known methods of diagnosing the tone wheel sensors include removing a suspect sensor and replacing it with one that is known to be good, measuring the sensor voltages with a voltmeter, or observing sensor signals with an oscilloscope. Each of these methods has undesirable aspects. For example, replacing the tone wheel sensor requires that a technician have a known-good sensor on hand and that he expend valuable time swapping the sensors only to determine if the old one was the cause of a problem. If the old sensor was good, then the technician wasted time in replacing it.

The method of using a voltmeter also has undesirable aspects. For example, a voltmeter display typically does not have sufficient bandwidth to track each pulse from a tone wheel sensor. Even if it did, it is unlikely that a technician could comprehend a voltmeter reading that changes so rapidly. This makes the voltmeter practically useless for determining whether a sensor is intermittently malfunctioning due to vibration, etc. In addition, a voltmeter does not provide power to the sensor, nor does it provide the proper load to the sensor signal. Therefore, many types of position sensors will have to be tested while they are connected to the vehicle wiring harness through a breakout box, which provides access to the signals.

Using an oscilloscope also presents the issue of providing power to the position sensor and using a breakout box to reach the signal. Furthermore, oscilloscopes are among the most difficult to use and expensive tools in an automotive electronics tool assortment. This means that many repair facilities may either not have an oscilloscope or not have a technician who is able to use one efficiently.

BRIEF SUMMARY OF THE INVENTION

In accordance with these needs identified in the prior art, a tone wheel sensor tester is provided. The tone wheel sensor tester is an electrical diagnostic tool for in situ testing of a tone wheel sensor mounted in proximity of a rotatable tone wheel. The tone wheel sensor produces a periodic pulse train signal as the rotatable tone wheel is rotated. The tool has a signal conditioning block for receiving the periodic pulse train signal and generating therefrom a logic-level signal having a frequency. A digital counter is clocked by the logic-level signal. A plurality of LEDs are controlled by the digital counter and are used to determine the operational condition of the tone wheel sensor by sequentially illuminating the LEDs at the frequency and in accordance with a counting sequence of the digital counter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE SEVERAL VIEWS OF THE DRAWING(S)

DETAILED DESCRIPTION OF THE INVENTION

Figure 1:
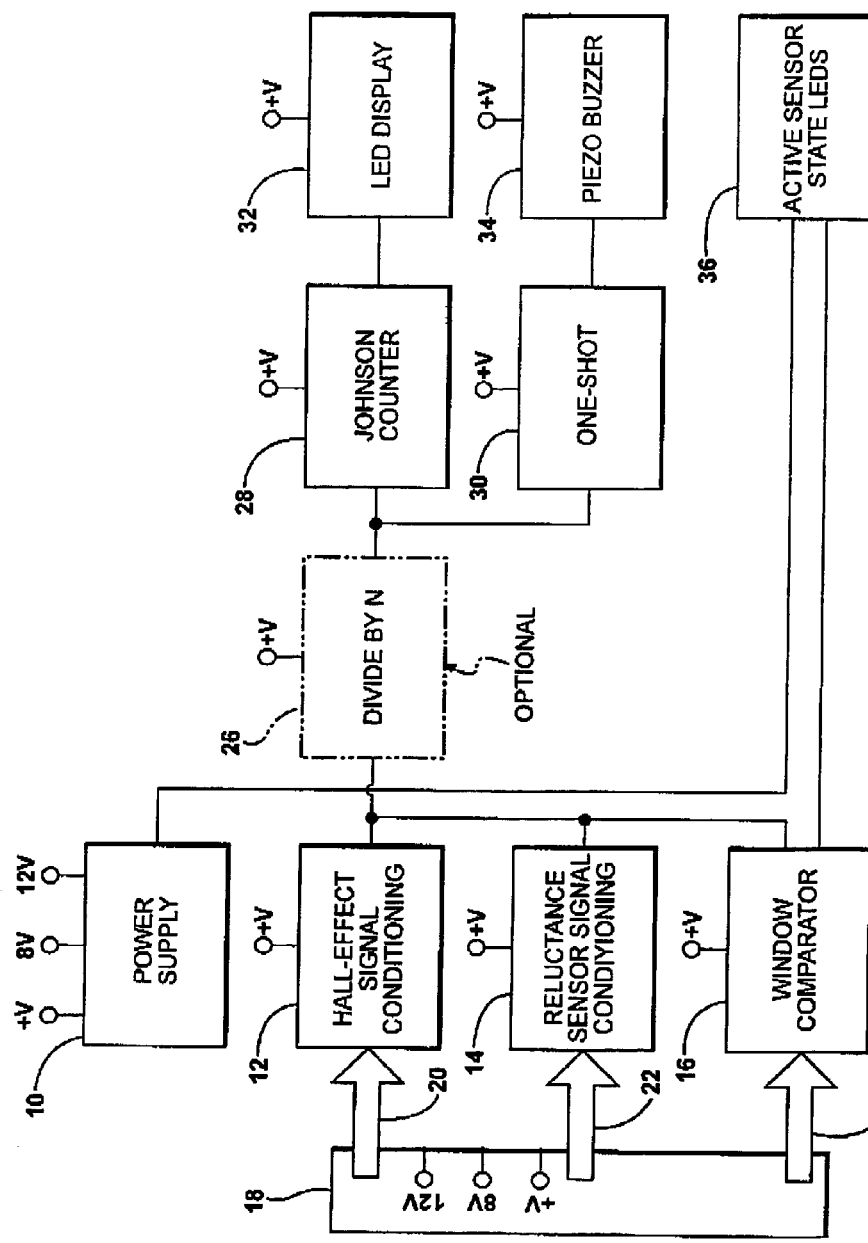
FIG. 1 depicts an electrical block diagram of a tone wheel sensor tester.

Turning now to FIG. 1, a block diagram of a tone wheel sensor tester is shown. The tone wheel sensor tester diagnoses hall-effect, reluctance, and active (a.k.a. magnetoresistive) tone wheel sensors which are well known in the art and not shown. A power supply 10 provides power at voltage +V. In one aspect, the power supply 10 contains a conventional 9V battery as a primary source. A linear regulator regulates the 9V down to 5V to supply +V. A power-off self-timer may also be used to prevent accidental discharge of the 9V battery. Power supply 10 may also contain a switching supply section to produce a voltage greater than 12V. The voltage from the switching supply may then be applied across linear regulators to provide regulated 8V and 12V sensor excitation sources for powering the sensor under test as required by the sensor. The switching supply section may be powered directly from the 9V battery.

A connector 18 is provided for attaching a jumper harness to mate with the connector of the tone wheel sensor under test. The sensor under test, which is not shown, remains mechanically in situ and is electrically connected to the tester. For hall-effect and active type sensors, the jumper harness connects the requisite excitation voltage to the sensor, with the excitation voltage being derived in the power supply 10. In one aspect of the invention, the excitation voltage is selected from V+, 8V and 12V.

In the event the sensor under test is a hall-effect type, the jumper harness is wired to provide the sensor signal to hall-effect conditioning block 12 via conductors 20. The hall-effect conditioning block 12 provides a pull-up voltage to the sensor's output and diode clamps it to V+ and ground as is known in the art. The sensor's output is then buffered to a logic level prior to exiting hall-effect conditioning block 12.

In the event the DUT is a reluctance type, the jumper harness is wired to provide the sinusoidal sensor signal to the reluctance sensor signal-conditioning block 14. Block 14 references the sensor to ground and provides a sensor load with respect to ground. The loaded sensor signal is passed through an RC-filter and then diode clamped to +V and ground as is known in the art. Remaining sinusoidal components of the filtered signal are then removed by a comparator or Schmitt-trigger buffer stage. The output of the buffer stage provides logic level signal to the output of block 14.

In the event the sensor is an active type, the jumper harness is wired to provide the sensor signal to the window comparator block. The window comparator provides a shunt resistor to ground. The voltage across the shunt resistor provides an input voltage to the window comparator. In the inventors' embodiment, a 115 ohm shunt resistor is used to develop approximately 805 mV for a logic low sensor signal of 7 mA and 1.610 V for a logic high sensor signal of 14 mA. The window comparator circuit has four windows that represent pass-fail criteria for the active sensor. The first window is from 0–669 mV and represents an open sensor. The second window is from 670 mV–976 mV and represents a valid logic low signal. The third window is from 977 mV–1.339 V and represents an indeterminate logic state. The fourth window is from 1.340V–1.951V and represents a valid logic high signal. A voltage greater than 1.952 V across the shunt resistor represents a short circuit state in the sensor signal. A comparator circuit for each voltage window is connected to an LED (described later) that provides an instantaneous visual indication of the current flow through the sensor. Additionally, a logic level output signal is tapped from the output of the comparator used to provide the logic-low window. This logic level output signal provides the output from block 16.

The logic level outputs of conditioning blocks 12 and 14, and the logic-low comparator of the window comparator block 16, are logically OR'd and then input to an optional divide-by-N counter 26. The divide-by-N counter provides a pulse train, which is 1/N of the frequency of the logic-level pulse train being emitted by the signal conditioning blocks. When used, the divide-by-N counter 26 helps to reduce the period of the pulse train to improve the user's comprehension of the output circuitry described later. A value of N=2 has shown to be suitable in the inventors' embodiment, however any positive integer N may be selected.

The output of the divide-by-N counter is provided to output circuitry, which provides an audible and visual indication of the DUT's operation. While either the audio or the visual output may be used alone, providing both in the tone wheel sensor tester is the inventors' preferred embodiment. The audible output may be provided by one-shot 30 and piezo-buzzer circuit 34. The one-shot is triggered by each edge of the divide-by-N 26 signal output. A 43 mS one-shot has shown to be suitable in the inventor's embodiment. The output of the one-shot 30 is provided to piezo-buzzer circuit 34 that provides a beep sound during each pulse from the one-shot. A piezo-buzzer circuit producing a sound of 4.1 KHz has shown to be suitable in the inventors' embodiment.

The visual output may be provided by a Johnson counter 28 and LEDs 32. The Johnson counter may be implemented with one or more CD74HC4017M devices manufactured by TEXAS INSTRUMENTS. Each output of the Johnson counter is connected to an LED that illuminates when its respective output is energized. The output of the divide-by-N counter 26 provides a clock input to the Johnson counter.

Figure 2:
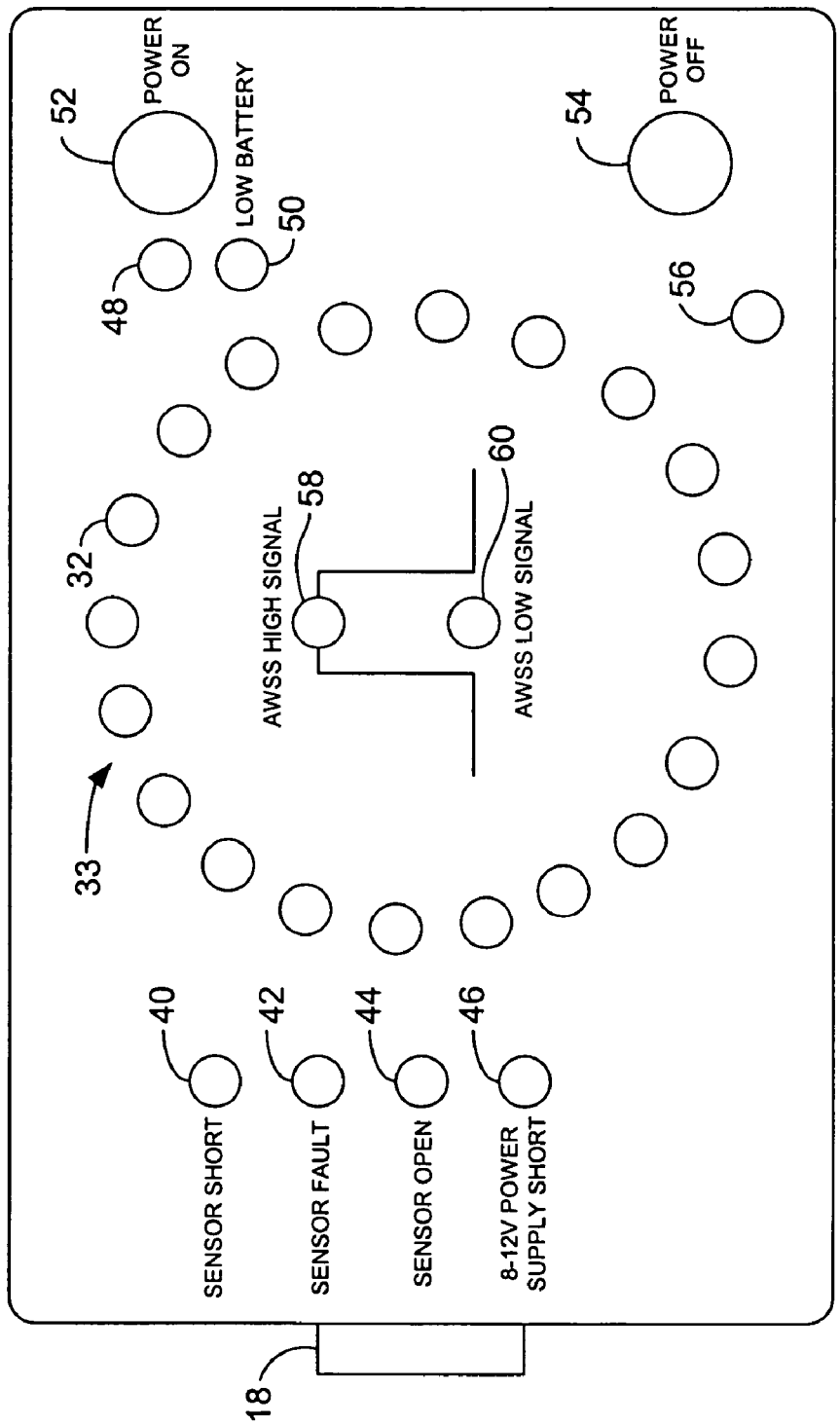
FIG. 2 depicts an exterior view of a tone wheel sensor tester.

Turning now to FIG. 2, a frontal view of a tone wheel tester is shown. Connector 18 is secured to the side of the unit and provides an electrical connection for the appropriate jumper cable to the sensor being tested. Switches 52 and 54 are provided for turning the power supply 10 on and off, respectively. A low battery LED 50 may be used to provide an indication of a low battery voltage in the power supply 10. The LED may be driven by a comparator arranged to turn the LED on when the battery voltage falls below a predetermined level, such as 6.23 V in the event a 9V battery is used in the power supply 10. LED 48 is powered by the power supply and illuminates while the tone wheel sensor tester is turned on.

An LED ring 33 is comprised of LEDs 32 that are connected to the outputs of Johnson counter 28 as described earlier. The LEDs 32 are arranged such that they illuminate one at a time in clockwise or counterclockwise succession as the Johnson counter is clocked through its counting sequence. This pattern of illumination provides a visual indication that the sensor is operating and, since it mimics a rotating shaft, it is simpler to interpret than a voltmeter reading or oscilloscope display of the prior art. If the LEDs do not illuminate sequentially at a rate in accordance with the rate of passing teeth or slots of the target wheel, then an intermittent output signal from the sensor has been detected.

An opening 56 is provided for the piezo buzzer of circuit block 34 to emit the beep sound to the user, the piezo buzzer being mounted in the panel behind the opening 56.

LEDs 40, 42, 44, 46, 58, and 60 are provided to indicate additional information when connector 18 is connected to an active sensor. In such an arrangement, the output of the comparator from the 670 mV–976 mV window is connected to LED 60, which illuminates when the sensor output is at a valid logic low state. In a similar fashion, the output of the comparator from the 1.340V–1.951V window is connected to LED 58 that illuminates when the sensor output is at a valid logic high state; the output of the comparator from the >=1.952V window is connected to LED 40 that illuminates when the sensor signal indicates a short circuit state in the sensor signal; the output of the comparator from the 977 mV–1.339 V window is connected to LED 42 that illuminates when the sensor signal is in an indeterminate state, and the output of the comparator from the 0–669 mV window is connected to LED 44 that illuminates when the sensor signal indicates an open circuit. LED 46 may be driven by a over-current detector in the 8V/12V section of power supply 10. Therefore, if the output 8V/12V power supply becomes shorted and its output current becomes excessive, then the over-current detector will illuminate the LED and indicate to the user that the 8V/12V power supply output has been shorted.

While the best mode for carrying out the invention has been described in detail, those familiar with the art to which this invention relates will recognize alternative designs and embodiment for practicing the invention. Thus, the above-described preferred embodiment is intended to be illustrative of the invention that may be modified within the scope of the following appended claims.

What is claimed is:

1. An electrical diagnostic tool for in situ testing of a tone wheel sensor mounted in proximity of a rotatable tone wheel and where the tone wheel sensor produces a periodic pulse train signal as the rotatable tone wheel is rotated, the tool comprising:

a signal conditioning block for receiving the periodic pulse train signal and generating therefrom a logic-level pulse signal having a frequency;

a digital counter clocked by said logic-level pulse signal and having a plurality of outputs sequentially activated in accordance with a count of logic-level signal pulses; and a plurality of LEDs each coupled to one of the plurality of outputs of said digital counter, the operational condition of the tone wheel sensor being indicated by a frequency and sequence of illumination of the LEDs by the digital counter outputs.

2. The diagnostic tool of claim 1 further comprising an indicator element coupled to the signal conditioning block for receiving an indication of a tone wheel sensor fault condition.

3. The diagnostic tool of claim 1 further comprising a power supply for providing an excitation voltage to the tone wheel sensor.

4. The diagnostic tool of claim 3 wherein said power supply generates a plurality of excitation voltages each corresponding to one of a like plurality of tone wheel sensor types.

5. The diagnostic tool of claim 3 further comprising a fault indicator LED for indicating that the power supply is shorted.

6. The diagnostic toot of claim 1 wherein said signal conditioning block comprises a window comparator circuit for indicating the logic states of the periodic pulse train.

7. The diagnostic tool of claim 1 further comprising a buzzer circuit for providing a tone coincident with each pulse of said pulse train signal.

8. The diagnostic tool of claim 1 wherein said plurality of LEDs are arranged in a geometric pattern.

9. The diagnostic tool of claim 8 wherein said geometric pattern is circular.

10. The diagnostic tool of claim 1 wherein said digital counter is a Johnson counter.

11. An electrical diagnostic tool for in situ testing of a tone wheel sensor mounted in proximity of a rotatable tone wheel and where the tone wheel sensor produces a periodic pulse train signal as the rotatable tone wheel is rotated, the tool comprising:
  a signal conditioning block for receiving the periodic pulse train signal and generating therefrom a logic-level pulse signal having a frequency;
  a divide-by-N counter clocked by said logic-level pulse signal and generating therefrom a pulse train at a second frequency;
  a digital counter clocked by said pulse train at said second frequency and having a plurality of outputs sequentially activated in accordance with a count of pulses in the logic-level pulse signal; and
  a plurality of LEDs each coupled to one of the plurality of outputs of said digital counter, a proper operational condition of the tone wheel sensor being indicated by the LEDs being sequentially illuminated at said second frequency and in accordance with a counting sequence of said digital counter.

12. The diagnostic tool of claim 11 further comprising an indicator element coupled to the signal conditioning block for receiving an indication of a tone wheel sensor fault condition.

13. The diagnostic tool of claim 11 further comprising a power supply for providing an excitation voltage to the tone wheel sensor.

14. The diagnostic tool of claim 13 wherein said power supply generates a plurality of excitation voltages each corresponding to one of a like plurality of tone wheel sensor types voltages.

15. The diagnostic tool of claim 13 further comprising a fault indicator LED for indicating that the power supply is shorted.

16. The diagnostic tool of claim 11 wherein said signal conditioning block comprises a window comparator circuit for indicating the logic states of the periodic pulse train.

17. The diagnostic tool of claim 11 further comprising a buzzer circuit for providing a tone coincident with each pulse of said pulse train signal at said second frequency.

18. The diagnostic tool of claim 11 wherein said plurality of LEDs are arranged in a geometric pattern.

19. The diagnostic tool of claim 18 wherein said geometric pattern is circular.

20. The diagnostic tool of claim 11 wherein said digital counter is a Johnson counter.

* * * * *